(12) United States Patent
Nishida

(10) Patent No.: US 9,712,716 B2
(45) Date of Patent: Jul. 18, 2017

(54) PRINT SYSTEM, CONTROL METHOD, AND PRINT APPARATUS

(71) Applicant: CANON KABUSHIKI KAISHA, Tokyo (JP)

(72) Inventor: Takahiko Nishida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/218,755

(22) Filed: Jul. 25, 2016

(65) Prior Publication Data
US 2017/0048413 A1 Feb. 16, 2017

(30) Foreign Application Priority Data

Aug. 10, 2015 (JP) ................................ 2015-158499

(51) Int. Cl.
G06F 3/12 (2006.01)
H04N 1/32 (2006.01)
H04N 1/00 (2006.01)
H04N 1/327 (2006.01)

(52) U.S. Cl.
CPC ..... *H04N 1/32101* (2013.01); *H04N 1/00217* (2013.01); *H04N 1/00344* (2013.01); *H04N 1/32771* (2013.01); *H04N 2201/3205* (2013.01); *H04N 2201/3207* (2013.01); *H04N 2201/3274* (2013.01)

(58) Field of Classification Search
None
See application file for complete search history.

(56) References Cited

U.S. PATENT DOCUMENTS

| 6,040,920 A * | 3/2000 | Ichiriki ............. G06F 17/30011 358/403 |
| 8,780,377 B2 | 7/2014 | Nishida et al. |
| 8,843,516 B2 | 9/2014 | Leong et al. |
| 2004/0024848 A1* | 2/2004 | Smith ................. G06F 17/3089 709/219 |
| 2007/0035766 A1* | 2/2007 | Yamamura .......... H04L 63/0428 358/1.15 |
| 2007/0171467 A1* | 7/2007 | Mokuya ................ G06F 3/1208 358/1.15 |

(Continued)

FOREIGN PATENT DOCUMENTS

JP 5008851 B 8/2012

*Primary Examiner* — Huo Long Chen
(74) *Attorney, Agent, or Firm* — Fitzpatrick, Cella, Harper & Scinto

(57) ABSTRACT

A print apparatus comprises: a holding unit that holds destination information of a print server trusted as a request destination; a determination unit that determines, when a print request is received, whether destination information of a print server designated by the print request matches the held destination information; an access unit that requests access to the print server indicated by the held destination information if the determination unit determines that there is no match for the destination information; and an update unit that updates the held destination information to the destination information of the print server designated by the received print request if, as a response to the request, a destination that is the same as in the destination information of the print server designated by the received print request is received as a redirect destination.

11 Claims, 8 Drawing Sheets

(56) References Cited

U.S. PATENT DOCUMENTS

| | | | |
|---|---|---|---|
| 2007/0195357 A1* | 8/2007 | Matsuba | G06F 3/1204 358/1.15 |
| 2009/0296133 A1* | 12/2009 | Kawabushi | H04N 1/00222 358/1.15 |
| 2010/0208301 A1* | 8/2010 | Zenju | H04L 29/12207 358/1.15 |
| 2011/0157632 A1* | 6/2011 | Tsutsumi | G06F 3/1203 358/1.15 |
| 2011/0188063 A1* | 8/2011 | Nuggehalli | G06F 3/1236 358/1.13 |
| 2011/0317209 A1* | 12/2011 | Uchida | G06F 3/1203 358/1.15 |
| 2012/0307298 A1* | 12/2012 | Ishige | H04N 1/00222 358/1.15 |
| 2013/0003117 A1* | 1/2013 | Hirata | G06F 3/1204 358/1.15 |
| 2013/0346472 A1* | 12/2013 | Wheeldon | H04L 67/2814 709/203 |
| 2016/0179447 A1* | 6/2016 | Ochi | G06F 3/1259 358/1.15 |
| 2016/0205276 A1 | 7/2016 | Nishida | |

* cited by examiner

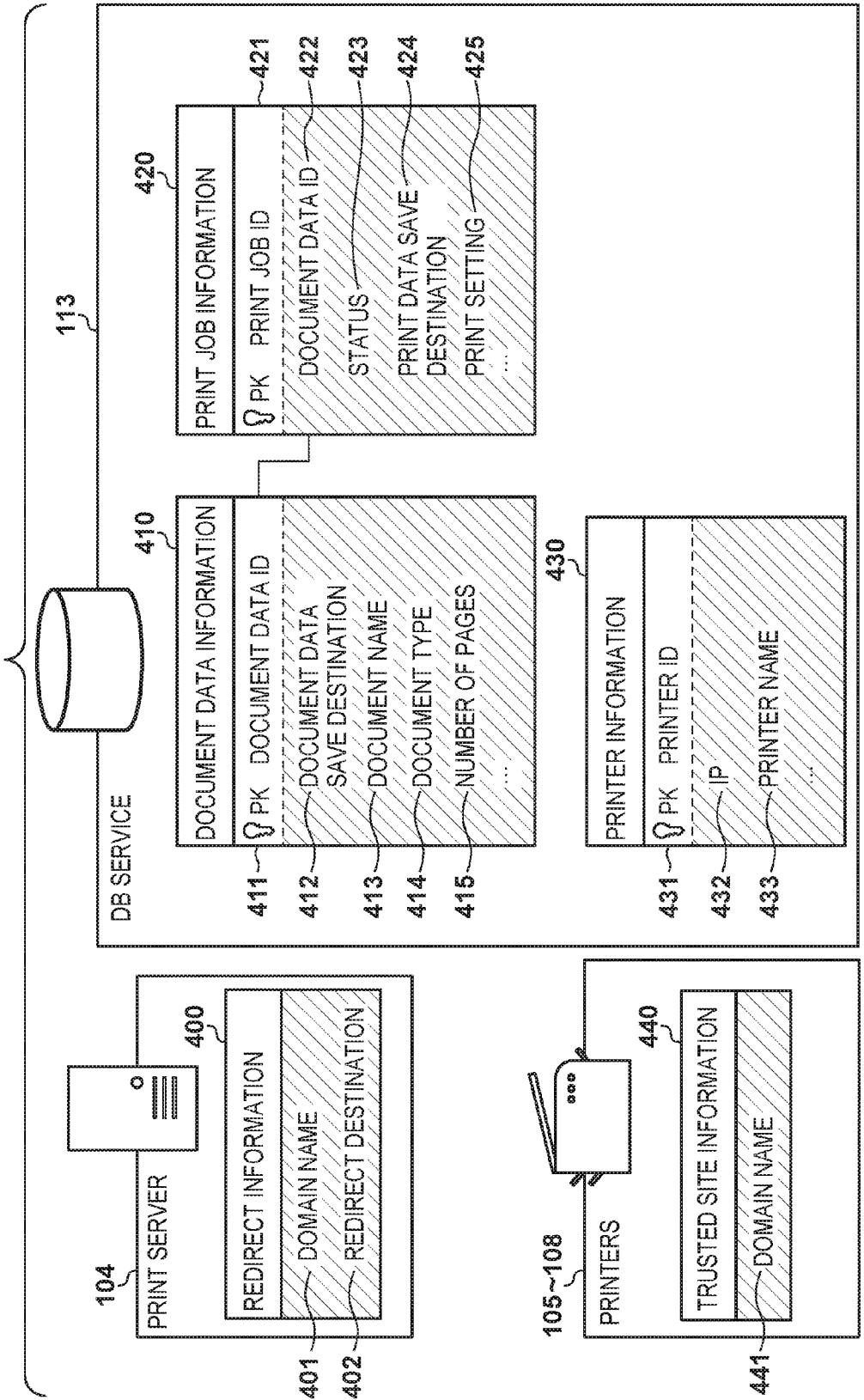

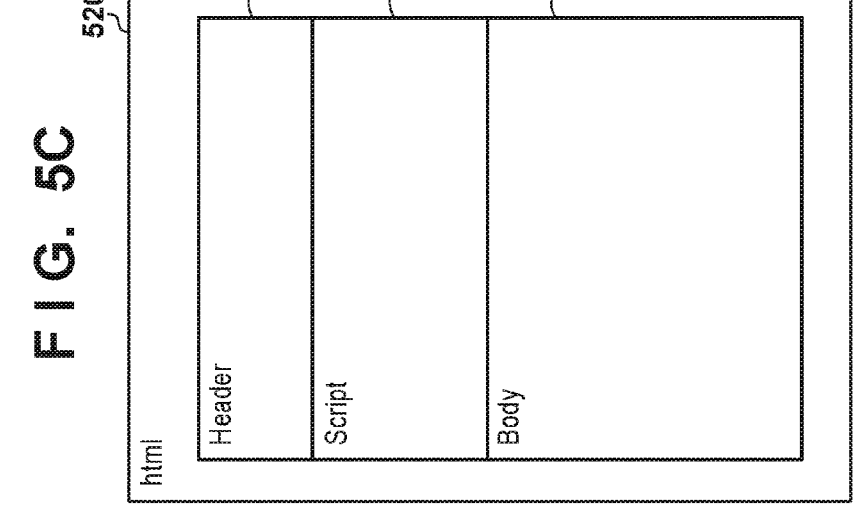
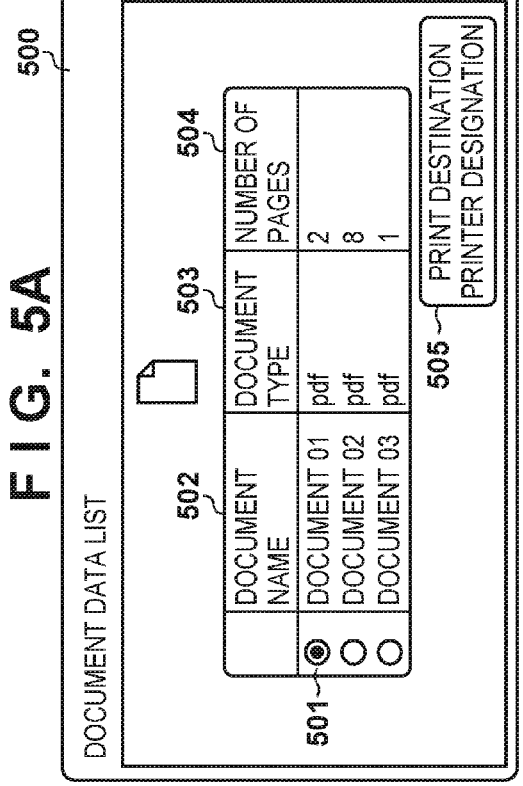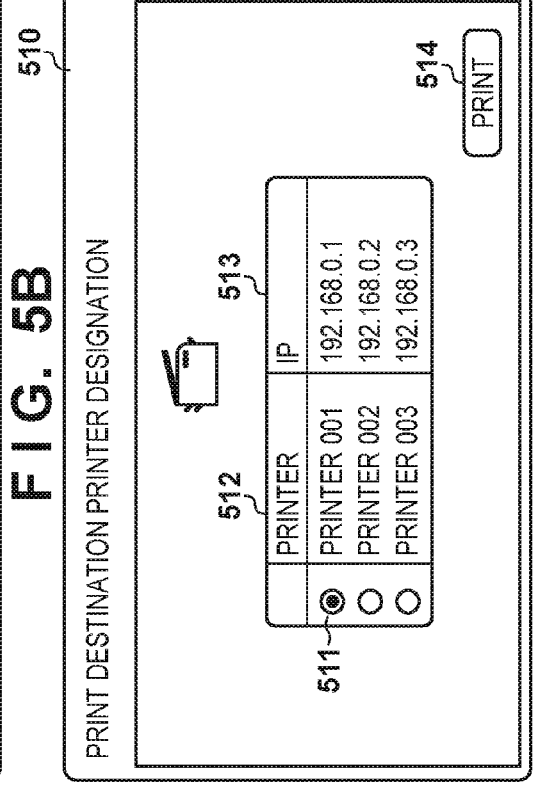

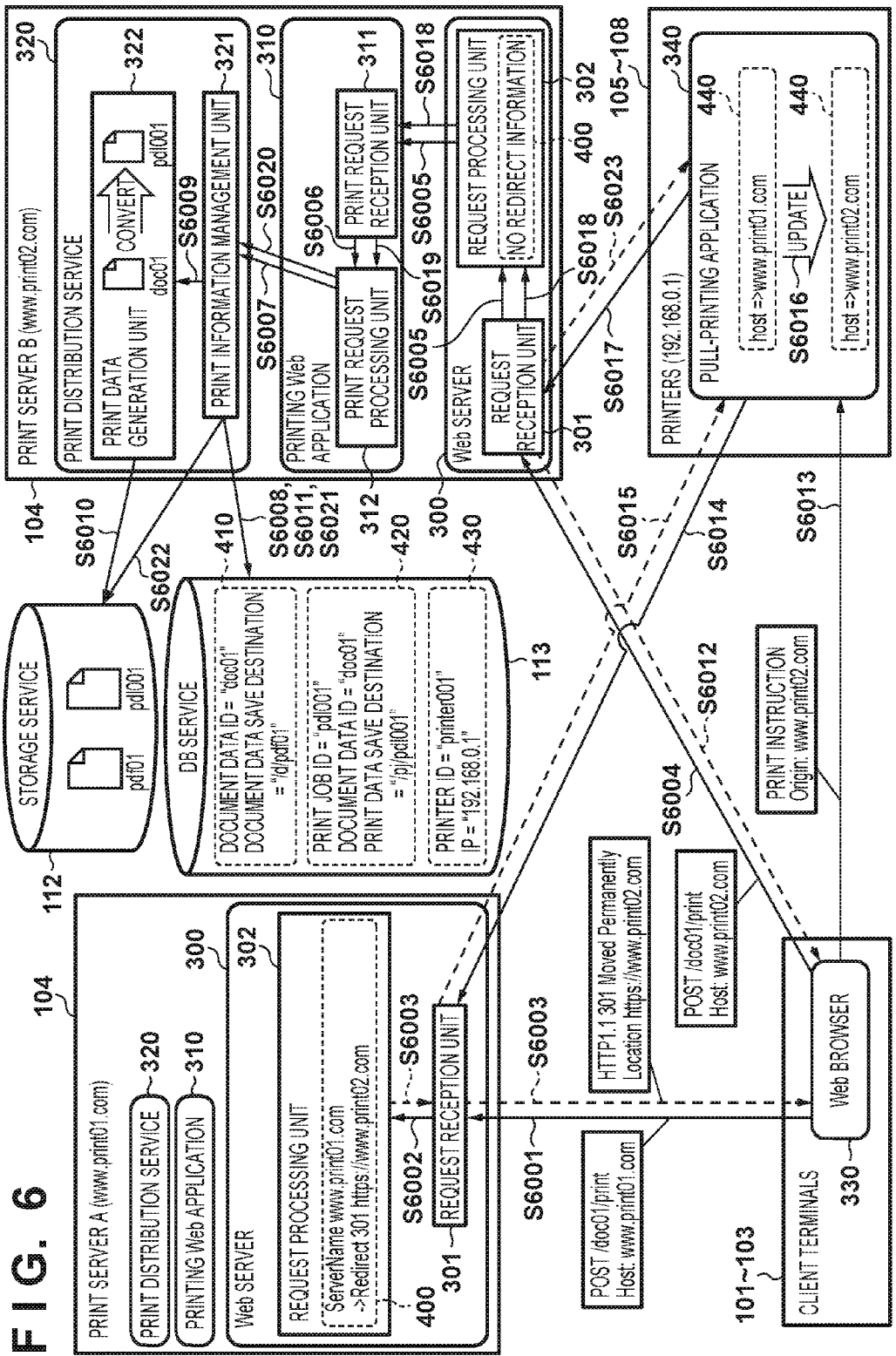

PRINT SYSTEM, CONTROL METHOD, AND PRINT APPARATUS

BACKGROUND OF THE INVENTION

Field of the Invention

The present invention relates to a print system, a method of controlling the same, and a print apparatus.

Description of the Related Art

In recent years, businesses in which a server on the Internet provides a cloud service have been developing. Accompanying this, print servers have also started to be provided on the Internet for print service functions. Generally, in a case where a print service is provided as a cloud service, a pull-type print method in which a printer obtains print data over the Internet from a print server is used. This is because, in communication via the Internet, push-type communication cannot be performed directly towards a client over a firewall from a server side. In a case where print processing is performed using a print service, a user uses a Web browser or the like to execute a print operation from a UI (User Interface) that a print service provides. At such a time, the Web browser, based on information obtained from the print service, makes an instruction to a printer, such as one to obtain print data. The printer, in accordance with such an instruction, executes various processes accompanying printing by accessing the print service.

One method for realizing these processes is a method of executing a script such as JavaScript (registered trademark) obtained from the print service on the Web browser, and performing a cross-domain access of the printer. In a cross-domain access, it is necessary from the perspective of security to set rules in advance for controlling access on the side that is accessed so that an access issued by a third party having malice intent is not executed. For this reason, for print services, a domain name of the print service is registered as a trusted site in a printer in advance, and a check of an access issuing source is performed in a case where a cross-domain access is received.

Meanwhile, due to the diversification of domain name forms, and the simplification of Web site transfer due to the recent spread of cloud services, cases in which the domain name of a service is changed are increasing. For print services, there is the possibility of a domain name change, and at that time it is necessary to change a domain name that is registered as a rule for controlling access that is held in the printer as previously described, and so there is a demand for a method of performing an update of the trusted site information safely and easily.

Accordingly, methods of managing a list of trusted sites on a user terminal, on the Web or the like have been devised. For example, as in Japanese Patent No. 5008851, there are those in which a list of Web addresses that a user permits is managed, and in which access control is realized by verifying the Web address when it is detected that information is sent from a Web browser to another Web address. In Japanese Patent No. 5008851, in the client terminal, a program that operates on a Web browser verifies whether or not a Web address of a destination to which to send information is a permitted Web address. Also, by providing functions by which it is possible to perform addition or deletion of a Web address that a respective user permits, a function by which information of a trusted site is rewritten is realized.

However, in the technique of Japanese Patent No. 5008851, it is necessary that each user rewrite the settings of all printers using a print service deployed in the world in the case where the domain name of the print service is changed. Furthermore, a user ceases to be able to use the print service until the rewriting work is performed.

SUMMARY OF THE INVENTION

According to one aspect of the present invention, there is provided a print system in which a print server and a print apparatus are communicably connected, wherein the print apparatus comprises: a holding unit configured to hold destination information of a print server trusted as a request destination; a reception unit configured to receive a print request; a determination unit configured to determine, when the print request is received by the reception unit, whether destination information of a print server designated by the print request matches the destination information held by the holding unit; an access unit configured to request access to the print server indicated by the destination information held by the holding unit if the determination unit determines that there is no match for the destination information; and an update unit configured to update the destination information held by the holding unit to the destination information of the print server designated by the print request received by the reception unit if, as a response to the request by the access unit, a destination that is the same as in the destination information of the print server designated by the print request received by the reception unit is received as a redirect destination, and wherein the print server comprises: a reception unit configured to receive a request; a management unit configured to manage in association destination information of a first destination and destination information of a second destination that becomes a redirect destination of the request; and a processing unit configured to respond, if a destination designated by the request received by the reception unit is the first destination, to a request source of the request so as to redirect the request to the second destination, based on the destination information managed by the management unit.

According to another aspect of the present invention, there is provided a print apparatus communicably connected to a print server, comprising: a holding unit configured to hold destination information of a print server trusted as a request destination; a reception unit configured to receive a print request; a determination unit configured to determine, when the print request is received by the reception unit, whether destination information of a print server designated by the print request matches the destination information held by the holding unit; an access unit configured to request access to the print server indicated by the destination information held by the holding unit if the determination unit determines that there is no match for the destination information; and an update unit configured to update the destination information held by the holding unit to the destination information of the print server designated by the print request received by the reception unit if, as a response to the request by the access unit, a destination that is the same as in the destination information of the print server designated by the print request received by the reception unit is received as a redirect destination.

According to another aspect of the present invention, there is provided a method for controlling a print system in which a print server and a print apparatus equipped with a holding unit for holding destination information of the print server that is trusted as a request destination are communicably connected, comprising: in the print apparatus: receiving a print request; determining, when the print request is received, whether destination information of a print server designated by the print request matches the destination information held by the holding unit; requesting access to the print server indicated by the destination information held by the holding unit if it is determined that there is no match for the destination information; and updating the destination information held by the holding unit to the destination information of the print server designated by the received print request if, as a response to the requesting access, a destination that is the same as in the destination information of the print server designated by the received print request is received as a redirect destination, and in the print server: receiving a request; managing in association destination information of a first destination and destination information of a second destination that becomes a redirect destination of the request; and responding, if a destination designated by the received request is the first destination, to a request source of the request so as to redirect the request to the second destination, based on the managed destination information.

By the present invention, even in a case where there is a change in the domain name of a print service, it is possible to appropriately perform an update on the printer side at a time of use of the print service, and for the user to continue to use the print service without being aware of this.

Further features of the present invention will become apparent from the following description of exemplary embodiments (with reference to the attached drawings).

BRIEF DESCRIPTION OF THE DRAWINGS

FIG. 4 is a view for illustrating an example configuration of various information managed by a print system according to the present application invention.

FIGS. 5A, 5B, and 5C are views for showing examples of screens generated by the print server according to the present application invention.

FIG. 6 is a view for illustrating a processing sequence according to the present application invention.

DESCRIPTION OF THE EMBODIMENTS

Hereinafter, embodiments for working the present invention are explained using drawings.

[System Configuration]

Figure 1:
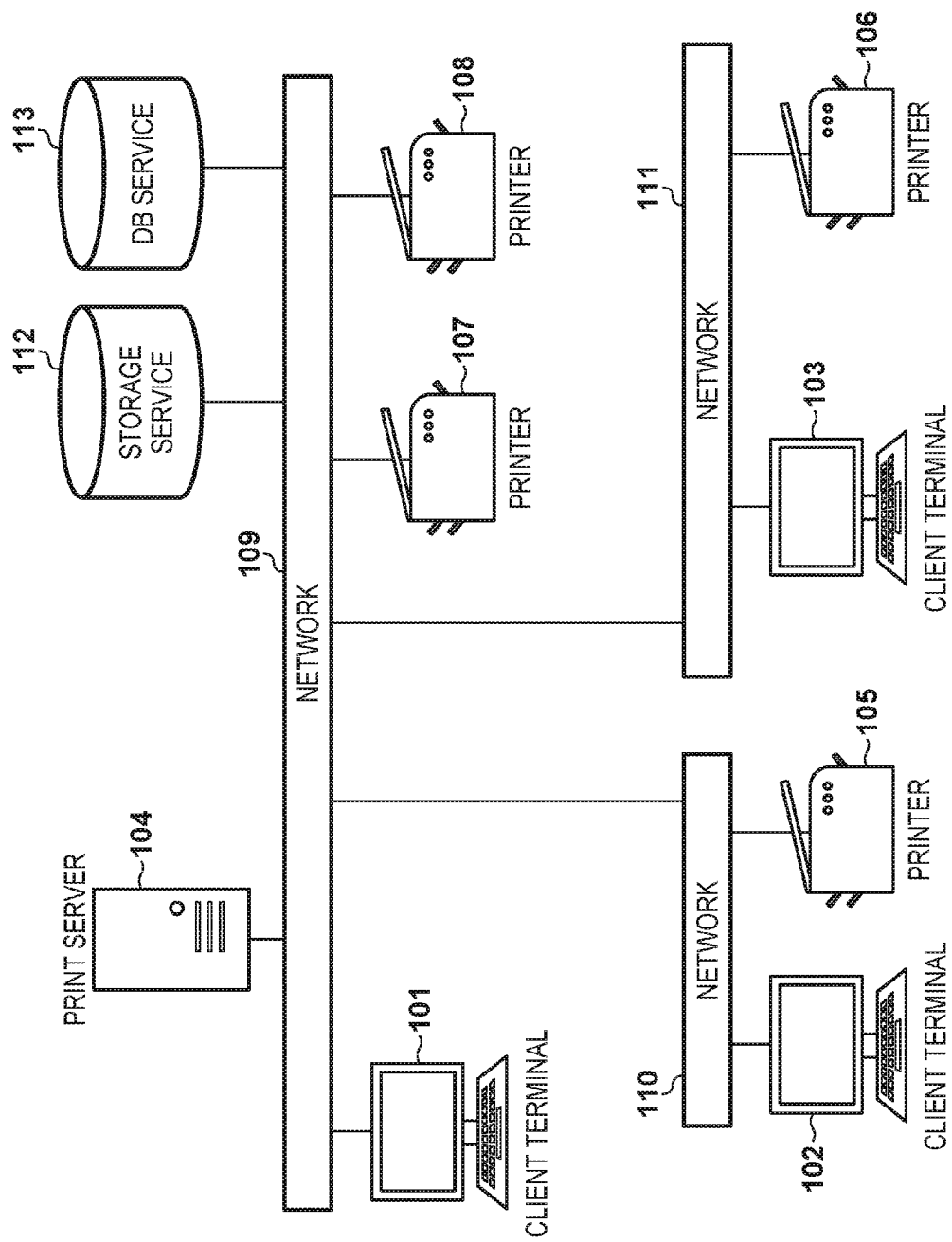
FIG. 1 is a view for illustrating an example of a network configuration according to the present application invention.

FIG. 1 is a view for illustrating an example of an overall configuration of a print system according to an embodiment of the present invention. In FIG. 1, client terminals 101-103, a print server 104, printers 105-108, a storage service 112, and a DB service 113 are communicably connected via networks 109-111. It is assumed that a plurality of the client terminals 101-103 and the printers 105-108 are connected.

The networks 109-111 are so-called communication networks that can transmit/receive data. In addition, each network may be realized by a combination of the Internet, a LAN (Local Area Network), a WAN (Wide Area Network), or various other networks, for example. In addition, communication means between the client terminals 101-103 and the print server 104, communication means, or the printers 105-108, and communication means between the print server 104 and the printers 105-108 may be respectively different. In addition, they may be wired/wireless. Note that a firewall (not shown) or the like is installed between each location, and access to an internal network of another location, that originates from an external network (or an external apparatus), for example, is restricted.

The client terminals 101-103 are configured from a desktop personal computer, a notebook computer, a smart phone, a tablet PC, or the like, for example. In the client terminals 101-103, an environment for executing a program such as a Web browser (an Internet browser, a WWW (World Wide Web) browser) is built-in.

In FIG. 1, the storage service 112 and the DB service 113 are a file server and a DB server connected by the networks 109-111, and can save and retrieve various data and managed information that the print server 104 manages.

In FIG. 1, one print server 104 is illustrated, but a plurality of print servers may be arranged in the print system. In conjunction with a change to a domain name, which is the problem to be solved of the present application invention, a case in which a print server itself physically changes can be handled by the present application invention.

[Hardware Configuration]

Figure 2:
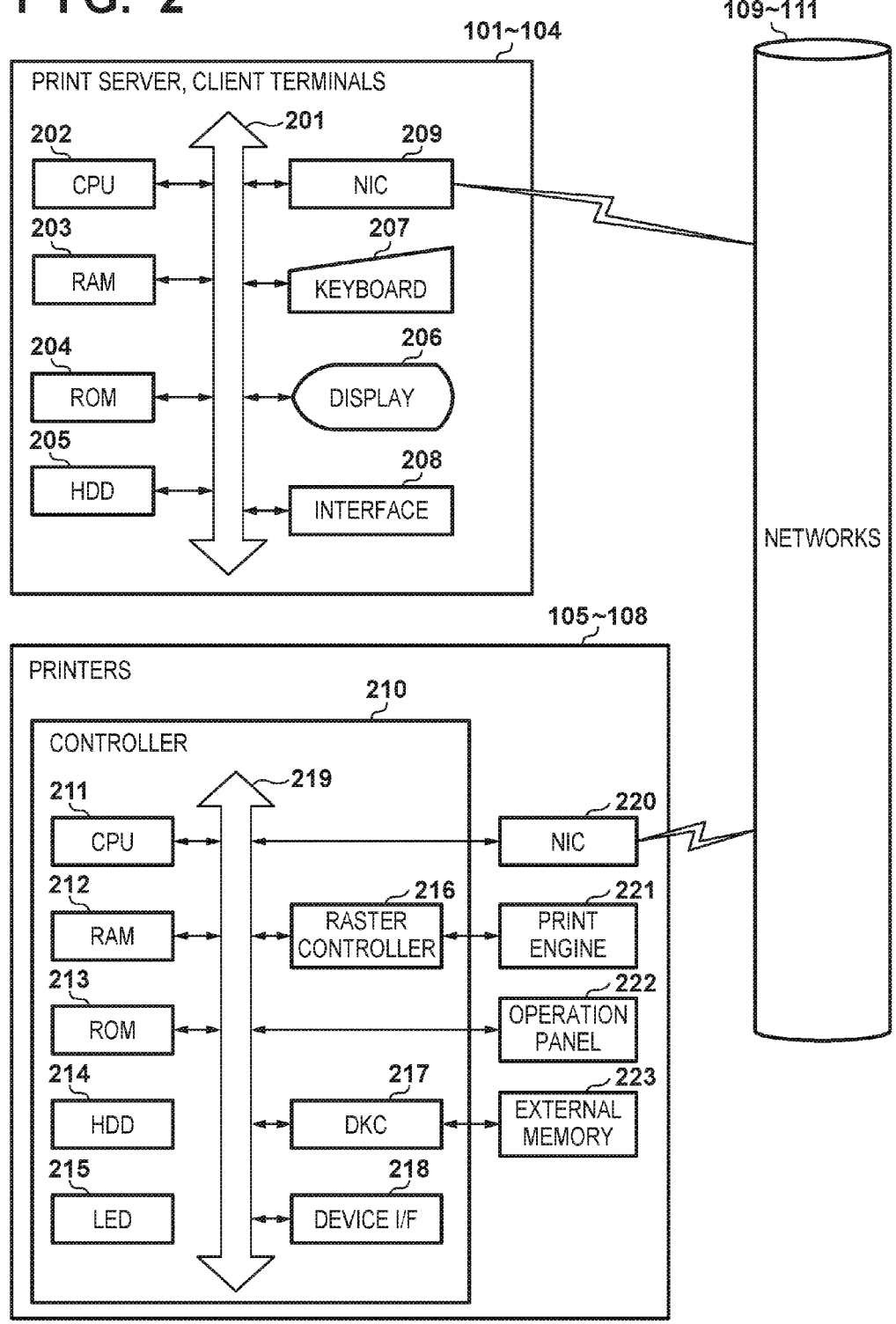
FIG. 2 is a view for illustrating an example of a hardware configuration of each apparatus according to the present application invention.

FIG. 2 is a view for illustrating examples of hardware configurations of the client terminals 101-103, the print server 104, and the printers 105-108 of the print system according to embodiments of the present invention. Here, explanation is given in which the client terminals 101-103 and the print server 104 are information processing apparatuses having the same hardware configuration, but they may be information processing apparatuses having respectively different configurations. In addition, explanation is given in which the printers 105-108, which are print apparatuses, have the same hardware configuration, but they may be network printers having respectively different configurations.

In the information processing apparatus, a CPU 202 performs control of the information processing apparatus overall. The CPU 202 reads and executes application programs or an OS (Operating System) stored in a hard disk (HDD) 205 to perform control for temporarily storing information, files, or the like necessary for execution of programs in a RAM 203. A ROM 204 is a non-volatile storage unit, and internally stores programs such as a basic I/O program, and various data such as printer information and print data used at a time of print processing. The RAM 203 is a storage unit that is a temporary storage unit, and functions as a work area, a main memory or the like of the CPU 202. An HDD 205 is a non-volatile storage unit, and functions as a large capacity memory. The HDD 205 stores application programs such as a Web browser, a print server program, an OS, various drivers, related programs, or the like.

A display 206 is a display unit, and displays a command inputted from a keyboard 207, an output screen of an application, a status of a printer, or the like. An interface 208 is an external apparatus I/F, and connects to a printing device, a USB device, and a peripheral device. The keyboard 207 is a keyboard that is a unit for inputting instructions from a user. Note that, as a unit for inputting instructions, a mouse or the like may also be connected. A system bus 201 controls a flow of data in an information processing apparatus, and connects each configuration element so that an exchange of data is possible. An NIC 209 is a network interface card, and performs an exchange of data with an external apparatus via the networks 109-111. Note that this is merely an example a configuration of the information processing apparatus, and there is no limitation to the example configuration of FIG. 2. For example, it is possible to change the storage destination of data or programs to be a ROM, a RAM, or an HDD in accordance with features.

In the printers 105-108, a controller 210 controls a control system for a printer. A CPU 211 performs control of the printer overall, and comprehensively controls access to various devices connected to a system bus 219. This control is performed based on control programs or the like stored in a ROM 213, or control programs and resource data (resource information) stored in an external memory 223 connected via a disk controller (DKC) 217. A RAM 212 functions as a work area, main memory, or the like of the CPU 211, and is configured so that it can extend a memory capacity by an option RAM (not shown) connected to an expansion port (not shown). An HDD 214 is a non-volatile external storage unit that functions as a large capacity memory, and stores a print control program, related programs, and the like. For an operation panel 222, a user interface and buttons for performing print operations are arranged. In addition, in the operation panel 222, a display unit such as an LED 215 or a liquid crystal panel, and buttons for performing operations such as a copy designation, display of a printer operation state, or settings such as for a printer operation mode are arranged. An NIC 220 is a network interface card, and performs an exchange of data with an external apparatus. A print engine 221 uses a known printing technique to perform a print operation, and an electrophotographic method (a laser beam method), an ink-jet method, or a sublimation method (thermal transfer), for example, are given as a suitable implementation systems. A raster controller 216 is a controller that converts print data described in PDL (Page Description Language) or PDF (Portable Document Format) to image data. A device I/F 218 is an I/F for connecting with a connectable external device by USB (Universal Serial Bus) or the like.

[System Configuration]

Figure 3:
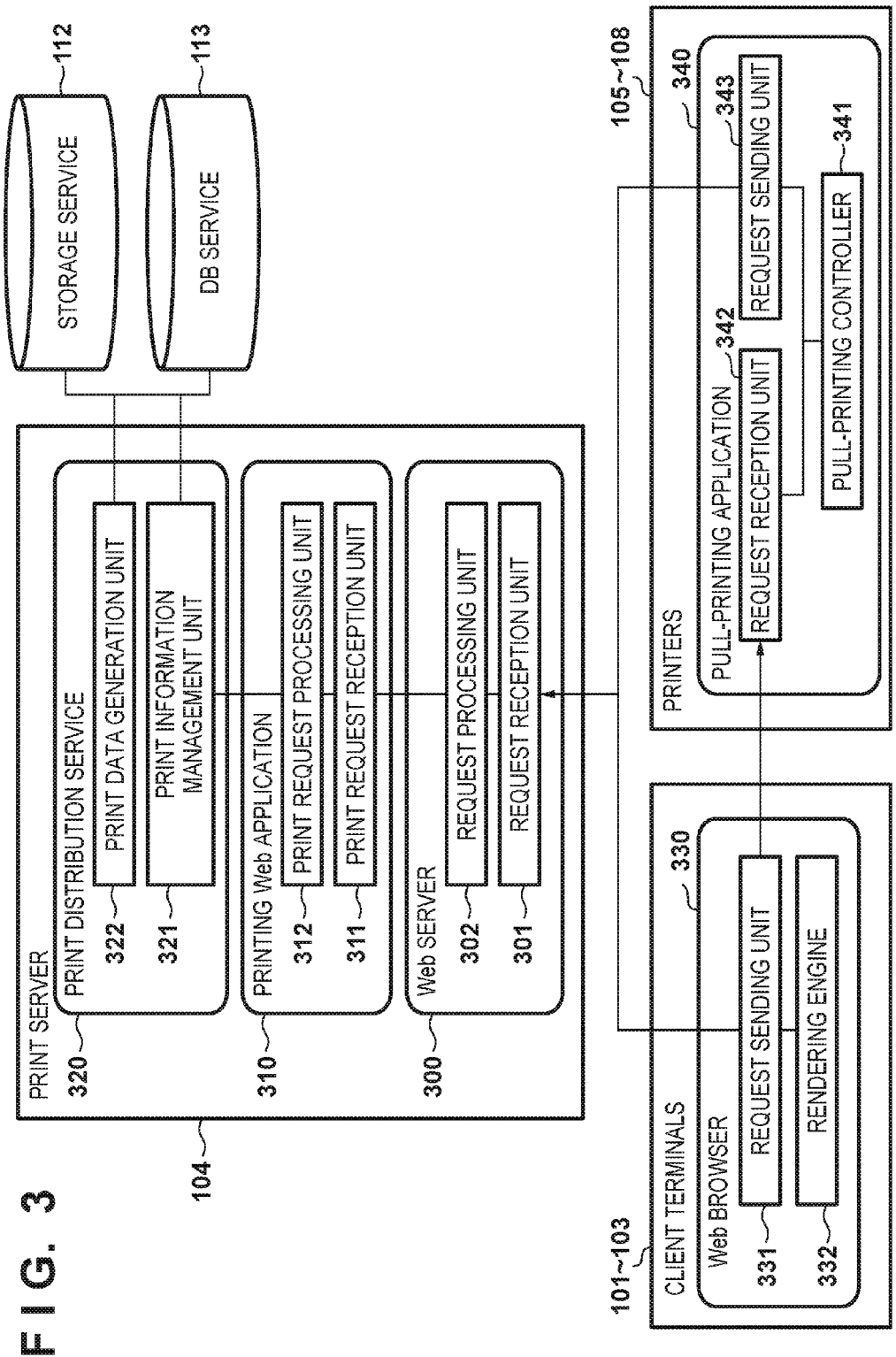
FIG. 3 is a view for illustrating an example of a module configuration of each apparatus according to the present application invention.

FIG. 3 is a view for illustrating an example of a module configuration of a print system according to embodiments. The print server 104 has a Web server 300, a printing Web application 310, and a print distribution service 320. The Web server 300 is configured by including a request reception unit 301 and a request processing unit 302. The Web server 300 conforms to HTTP (Hyper Text Transfer Protocol) to communicate with the client terminals 101-103 and the printers 105-108. In addition, the Web server 300 functions as a service program for returning a resource such as HTML (Hyper Text Markup Language) or JavaScript. Upon receiving a request by the request reception unit 301, the Web server 300, by the request processing unit 302, analyzes the details thereof, generates a response in accordance with preset details, or makes a request for processing to the printing Web application 310.

For example, the request processing unit 302 confirms Host header information that is included in header information of an HTTP request from the printers 105-108 or the client terminals 101-103, and that corresponds to a domain name of a request destination. The request processing unit 302 compares the header information included in the request with preset details, and makes a request for processing to the printing Web application 310 if a request destination is of a particular domain name. Here, the particular domain name corresponds to a domain name set as a domain name of the print server 104. However, if the preset details are of a different domain name, the request processing unit 302 returns an HTTP status "301" to a request source client terminal. Here, the HTTP status is a code that indicates the meaning of the response from the Web server 300 that is decided in HTTP. For example, "301" indicates "301 Moved Permanently", and indicates that the requested resource has been moved to a different site. At this time, the Web server 300 includes a URL (Uniform Resource Locator) of a movement destination in the response and returns it to the client terminals 101-103 or the printers 105-108. Note that the status code of a redirect is not limited to "301", and a value for another defined status code ("30x") may be used. Below, to the extent that it is not clearly recited, a request to the Web server 300 is assumed to be sent as is to a print request reception unit 311 of the printing Web application 310 through the request processing unit 302.

The printing Web application 310 is configured to include the print request reception unit 311 and a print request processing unit 312, and is a program for controlling an interface in the print service. Upon receiving a request via the Web server 300 at the print request reception unit 311, the printing Web application 310 performs an instruction to the print distribution service 320, at the print request processing unit 312, for obtainment of print information or generation processing of print data. In addition, upon receiving a result from the print distribution service 320, the printing Web application 310 shapes the result, and returns it to the client terminals 101-103 or the printers 105-108 through the Web server 300.

The print distribution service 320 is configured to include a print information management unit 321 and a print data generation unit 322, and is a program for controlling business logic in the print service. Upon receiving, at the print information management unit 321, the instruction for print data generation or print information obtainment from the printing Web application 310, the print distribution service 320 refers to the managed information managed in the DB service 113, and performs an update. In addition, the print information management unit 321 performs an instruction for print data generation to the print data generation unit 322, based on information obtained from the DB service 113, as necessary. In accordance with this instruction, the print data generation unit 322 converts document data held in the storage service 112 to print data. Here, the document data indicates any document file (for example, a PDF file) that can be edited or displayed by the client terminals 101-103. In addition, the print data indicates any print data (for example, PDL data) that can be interpreted at a time of printing by the printers 105-108.

The client terminals 101-103 comprise a Web browser 330. The Web browser 330 is configured by including a request sending unit 331 and a rendering engine 332. The request sending unit 331 sends a user operation or a request issued by the rendering engine 332 to the print server 104 or the printers 105-108. Here, communication, which includes the request from the Web browser 330 to the print server 104 or the printers 105-108, is assumed to comply with HTTP or HTTPS. The rendering engine 332 analyzes details that the request sending unit 331 received from the print server 104 or the printers 105-108 as a response to the request, and performs processing in accordance with the details. The rendering engine 332 performs interpreting or rendering processing on HTML data received from the print server 104, and executes JavaScript received from the same print server 104, for example. In execution of the JavaScript, it is possible to include various instructions relating to print processing with respect to the printers 105-108, and, in such a case, the rendering engine 332 sends a request to the printers 105-108 through the request sending unit 331.

Here, requests to the printers 105-108 issued in accordance with the JavaScript obtained from the print server 104 have a generation source (here, the print server 104) that is different to request destinations (here, the printers 105-108). These requests are commonly called cross-domain requests (or cross-origin requests), and restrictions in accordance with a generation source are necessary as a counter-measure for an attack that uses cross-site request forgery (CSRF). Operations here are standardized in RFC 6454: The Web Origin Concept. In the present embodiment, a cross-domain request from a client terminal to a printer is also sent after including a URL of the print server 104 as the generation source information. Validation is then performed in the printer, which is the request destination, as to whether this URL (in other words, the print server that is the generation source of the cross-domain request) can be trusted.

The printers 105-108 include a pull-printing application 340. The pull-printing application 340 is configured to include a pull-printing controller 341, a request reception unit 342, and a request sending unit 343. The pull-printing application 340 receives various cross-domain requests regarding print processing from the Web browser 330 of the client terminals 101-103 at the request reception unit 342. The pull-printing controller 341 is something that performs operation management of the pull-printing application 340 overall, and performs processing for analysis of requests received by the request reception unit 342. Here, by matching the request generation source information included in the cross-domain request and the trusted site information, the pull-printing controller 341 confirms whether this is a request generated from a trusted site. Explanation is given later regarding the trusted site information. Furthermore, in accordance with details of the request, the pull-printing controller 341 generates various requests to send to the print server 104 through the request sending unit 343.

[Managed Information]

FIG. 4 is a view for illustrating an example configuration of various information managed by the print system according to embodiments. The print server 104 holds and manages redirect information 400. The redirect information 400 is domain name information before and after the change at the time of a domain name change of the print server 104, and is referred to by the Web server 300. A domain name 401 is a domain name of the print server 104 before the domain name change, and a redirect destination 402 is a domain name of the print server 104 after the domain name change. The print server 104 refers to the redirect information 400 upon having received a request from the client terminals 101-103 or the printers 105-108. The print server 104 compares destination information included in the request with the redirect information 400, and if a corresponding redirect destination 402 exists, sets an HTTP status code to "301", and returns a response that includes information of the redirect destination 402. Note that, although the print server 104 for before and after the domain name change is assumed to be the same server here, it may be a physically different print server before and after the change.

The DB service 113 holds and manages document data information 410, print job information 420, and printer information 430. The document data information 410 is information of document data that is the source of the print data generation, and is managed by the print information management unit 321 of the print distribution service 320. A document data ID 411 is an identifier for uniquely identifying document data. A document data save destination 412 is information indicating a save destination of a document data file held in the storage service 112. The document data save destination 412 is information by which the print data generation unit 322 can access the document data file, such as a URL or a file path, for example. In addition, the document data information 410 includes a document name 413, a document type 414, and a number of pages 415, which are used in a screen display.

The print job information 420 is information of a print job, is managed by the print information management unit 321 of the print distribution service 320, and is generated when a print execution has been instructed with respect to the document data information 410. A print job ID 421 is an identifier for uniquely identifying a print job. A document data ID 422 corresponds to the document data ID 411, which indicates the document data information 410 that is the generation source of the print job information. A status 423 expresses a status of a print job, and is successively updated in accordance with notifications from the printers 105-108. As a status of the print job, the status 423 is a state such as stand-by, printing, printed, error termination, cancellation termination, or the like, for example. A print data save destination 424 is information indicating a save destination of a print data file held in the storage service 112. The print data save destination 424 is information by which the print data generation unit 322 can access the document data file, such as a URL or a file path, for example. In addition, the print job information 420 holds information regarding a print job, such as a print setting 425.

The printer information 430 is managed information associated with the printers 105-108, and is managed by the print information management unit 321. A printer ID 431 is an identifier for uniquely identifying printer information. An IP 432 is an IP address of the printers 105-108, and is information used when the Web browser 330 sends a request to the pull-printing application 340.

The printers 105-108 hold and manage trusted site information 440. The trusted site information 440 is domain name information of a site (here, the print server 104) having permission for a previously described cross-domain request, and is held by the pull-printing application 340 of the printers 105-108. The trusted site information 440 includes a domain name 441 of a trusted site. When a cross-domain request is received from the Web browser 330, the pull-printing application 340 compares this information and the generation source information included in the request, and determines whether to make a request to the print server 104.

[Screens]

FIGS. 5A and 5B are examples of Web screens generated by the printing Web application 310 equipped in the print server 104 of the print system according to embodiments, and displayed by the Web browser 330 of the client terminals 101-103.

Upon receiving the document data list request from the Web browser 330 through the Web server 300, the printing Web application 310 obtains the document data information 410 via the print distribution service 320. The printing Web application 310 uses the obtained document data information to generate a document data list screen 500 illustrated in FIG. 5A, and sends it to the Web browser 330. The document data list screen 500 displays a document name 502, a document type 503, and a number of pages 504 of each piece of document data managed by the print server 104. In addition, the document data list screen 500 is displayed to include a check-box 501 for selecting document data to print, and a print destination printer designation button 505 for issuing a print destination printer list obtainment request.

If the check-box 501 corresponding to the document data to be printed is selected and the print destination printer designation button 505 is pressed, the Web browser 330 sends a print request to the printing Web application 310 via the Web server 300 of the print server 104. Upon receiving this request, the printing Web application 310 obtains the printer information 430 from the print distribution service 320, generates a print destination printer designation screen 510 illustrated in FIG. 5B, and sends it the Web browser 330. The print destination printer designation screen 510 displays a printer name 512 and an IP 513 of the printers 105-108 managed by the print server 104. In addition, the print destination printer designation screen 510 is displayed to include radio buttons 511 for selecting a printer desired to be designated as the print destination, and a print button 514 for issuing a print request. Upon a radio button 511 corresponding to the print destination printer being selected and the print button 514 being pressed, the Web browser 330 sends the print request to the printing Web application 310.

Screen data 520 illustrated in FIG. 5C indicates an example configuration of html data of screens generated by the print server 104. A Body area 523 is an area in which information of content displayed on a screen is recorded. A Script area 522 is an area in which a script, which is JavaScript or the like, that the Web browser 330 of the client terminals 101-103 executes is recorded. By including processing for communicating with the printers 105-108 in the Script area 522, the print server 104 can cause various instructions relating to printing to be made towards the pull-printing application 340 from the Web browser 330. A Header area 521 records various attribute information relating to the screen.

[Sequence]

FIG. 6 is a view for illustrating a sequence of a print execution that accompanies a domain name change of the print server 104, in the print system according to embodiments.

A print server A and a print server B both indicate the same print server 104. Here, the print server 104 for before the domain name change is assumed to be the print server A, and the print server 104 after the domain name change is assumed to be the print server B. In addition, the domain name before the change is assumed to be "www.print01.com", and the domain name after the change is assumed to be "www.print02.com". These domain names are name resolved by a DNS server (not shown) to IP addresses for the print server A and the print server B, respectively. In addition, each domain name is a destination when a request is issued, and here the domain name before the change is also referred to as a "first destination" and the domain name after the change is also referred to as a "second destination". It is assumed that the domain names before and after the change are associated in the redirect information 400. In addition, explanation is given assuming an ID of a printer illustrated in FIG. 6 of "printer001", and an IP address of "192.168.0.1".

In step S6001, the Web browser 330 sends a print execution request to the print server A in accordance with an operation by a user to press the print button 514 of the print destination printer designation screen 510. This request is assumed to include a document data ID "doc01" and a printer ID "printer001", which are designated by the user. Furthermore, this request is assumed to include the domain name "www.print01.com" of the print server A as destination Host information that conforms to HTTP. Upon receiving the request by the request reception unit 301, in step S6002, the Web server 300, by the request processing unit 302, refers to the redirect information 400. Here, it is assumed that, the redirect information 400 of the print server A holds a setting for performing a redirect to "www.print02.com" for a request having as a destination "www.print01.com". The request processing unit 302 refers to the redirect information 400 and the destination Host information "www.print01.com" included in the request. As a result, in step S6003, the request processing unit 302 returns to the Web browser 330 a response having an HTTP status code "301" and the redirect destination "www.print02.com". In accordance with the response received in step S6003, the Web browser 330, in step S6004, sends the same request as in step S6001 to the redirect destination "www.print02.com", in other words the print server B. Here, the destination Host information of the request of step S6004 becomes "www.print02.com".

Upon receiving the request from the Web browser 330 in step S6004, the print server B refers to the redirect information 400 in the request processing unit 302 of the Web server 300. Here, it is assumed that the redirect information 400 of the print server B does not include redirect information. Accordingly, in step S6005, the request processing unit 302 sends the request from the Web browser 330 to the printing Web application 310.

Upon the print request processing unit 312 receiving the request in step S6006, the printing Web application 310 of the print server B, in step S6007, sends a print instruction to the print distribution service 320 from the print request processing unit 312. In step S6008, the print distribution service 320 accesses the DB service 113 by the print information management unit 321. The print information management unit 321 obtains document data information 410 which is the target from a document ID "doc001" included in the request. In step S6009, the print information management unit 321 sends a print data generation instruction to the print data generation unit 322, based on the document data information 410. In step S6010, the print data generation unit 322 accesses the storage service 112, and obtains a document data file "pdf01" which is the target of the printing. Furthermore, the print data generation unit 322 converts the document data file "pdf01" to a print data file "pd1001". The print data generation unit 322 saves the post-conversion print data file "pd1001" in the storage service 112. Upon the generation of the print data completing, in step S6011, the print information management unit 321 accesses the DB service 113, and generates the print job information 420 which includes the document data ID 422 and the print data save destination 424. In addition, based on the printer ID "printer001" included in the print request, the print information management unit 321 obtains the printer information 430 of the print destination from the DB service 113, and returns it to the printing Web application 310.

Upon receiving the printer information 430 and the print job information 420 for the print processing as the response to step S6007, the print request processing unit 312 generates, based on this information, the screen data 520 that includes JavaScript that can be executed by the Web browser 330. The screen data 520 includes in the Script area 522 processing for performing a print instruction that includes the printer information 430 and the print job information 420 as a cross-domain request to the printer that can be executed on the Web browser 330. The printing Web application 310 returns the screen data 520 to the Web browser 330 via the Web server 300.

In step S6012, upon receiving the screen data 520 as a response to the request that was received in step S6004, the Web browser 330 analyzes the HTML data by the rendering engine 332. The screen data 520 received here includes an instruction (JavaScript) for execution of a cross-domain request to the printer. The rendering engine 332 performs execution of the JavaScript and rendering based on the analysis result. By the execution of the JavaScript, in step S6013, the Web browser 330 sends to the pull-printing application 340 a cross-domain request that includes the print instruction, setting a generation source Origin as "www.print02.com", in other words the print server B. At this point, the print instruction included in the cross-domain request includes the print job information 420 and the printer information 430, and these pieces of information are used when the pull-printing application 340 makes a request for print execution to the print server 104.

Upon receiving the print instruction according to the cross-domain request by the request reception unit 342, the pull-printing application 340 performs an analysis by the pull-printing controller 341, and uses the trusted site information 440 to verify the Origin that is the generation source. Here, the trusted site information 440 that the printer manages holds the domain "www.print01.com" of the print server A before the domain name change. Meanwhile, the Origin information included in the print instruction obtained in step S6013 designates "www.print02.com", and because the domain names differ, at this point in time the cross-domain request is not processed. Accordingly, because the verification by the trusted site information 440 has failed, in step S6014, the pull-printing controller 341 performs, by the request sending unit 343, an access by an HTTP request to the domain name included in the trusted site information 440 currently held. Specifically, the pull-printing application 340 sets the destination Host information to "www.print01.com", and attempts to access the print server A. Upon receiving the access from the printer in step S6014, in step S6015 the print server A returns the redirect information. In other words, "www.print02.com" indicating the print server B is returned as redirection destination information here.

Upon receiving the redirect information in step S6015, the pull-printing application 340 refers to the redirection destination information by the pull-printing controller 341, and compares it with the Origin information included in the print instruction obtained in step S6013. If the result of comparison is that the redirect destination received from the print server A, which is a currently trusted site and the Origin information included in the print instruction of the cross-domain request match, in step S6016 the trusted site information 440 is updated to the value of the Origin information. Here, there is a match for "www.print02.com", and the trusted site information 440 is updated with this value.

In step S6017, the pull-printing application 340 sends the request for the print execution from the request sending unit 343 in accordance with the cross-domain request (print instruction) received in step S6013. The print execution request sent in step S6017 includes the print job information 420 in which the print job ID that is the target of the printing is "pd1001", and the printer information 430 in which the printer ID is "printer001". Upon receiving the print execution request the print server B, in step S6018, sends a request for print execution to the printing Web application 310, because the redirect information 400 does not include redirect information.

Upon the print request processing unit 312 receiving the request in step S6019, the printing Web application 310, in step S6020, sends a print execution request to the print distribution service 320 from the print request processing unit 312. In step S6021, the print distribution service 320 accesses the DB service 113 by the print information management unit 321. Then, the print information management unit 321 obtains the print job information 420 when is the target from the print job ID "pd1001" included in the request. In step S6022, the print information management unit 321 refers to the print data save destination from the print job information 420 that is the target of print execution obtained in step S6021, and obtains the print job data "pd1001". In step S6023, the print distribution service 320 returns the print data obtained in step S6022 to the printer (printer ID "printer001") as a response to the print execution request of step S6017, via the printing Web application 310 and the Web server 300.

The pull-printing application 340 for the printer (printer ID "printer001") performs a print execution by sending the print job data received in step S6023 to the controller 210.

By the above, the sequence of a print execution that accompanies a domain name change of the print server 104 according to the present embodiment completes. Note that, after the change of the domain name of the print server trusted by the printer side completes, the processing of step S6014 through step S6015 is not performed until a domain name change occurs again.

[Trusted Site Information Update Process]

Figure 7A:
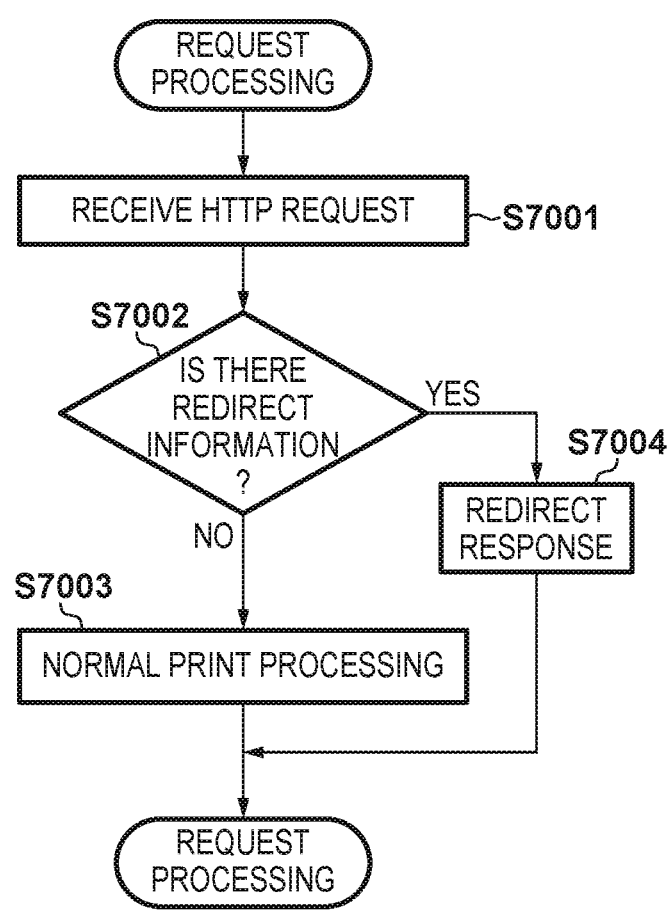
FIGS. 7A and 7B are views for illustrating flowcharts of processing according to the present application invention.
Figure 7B:
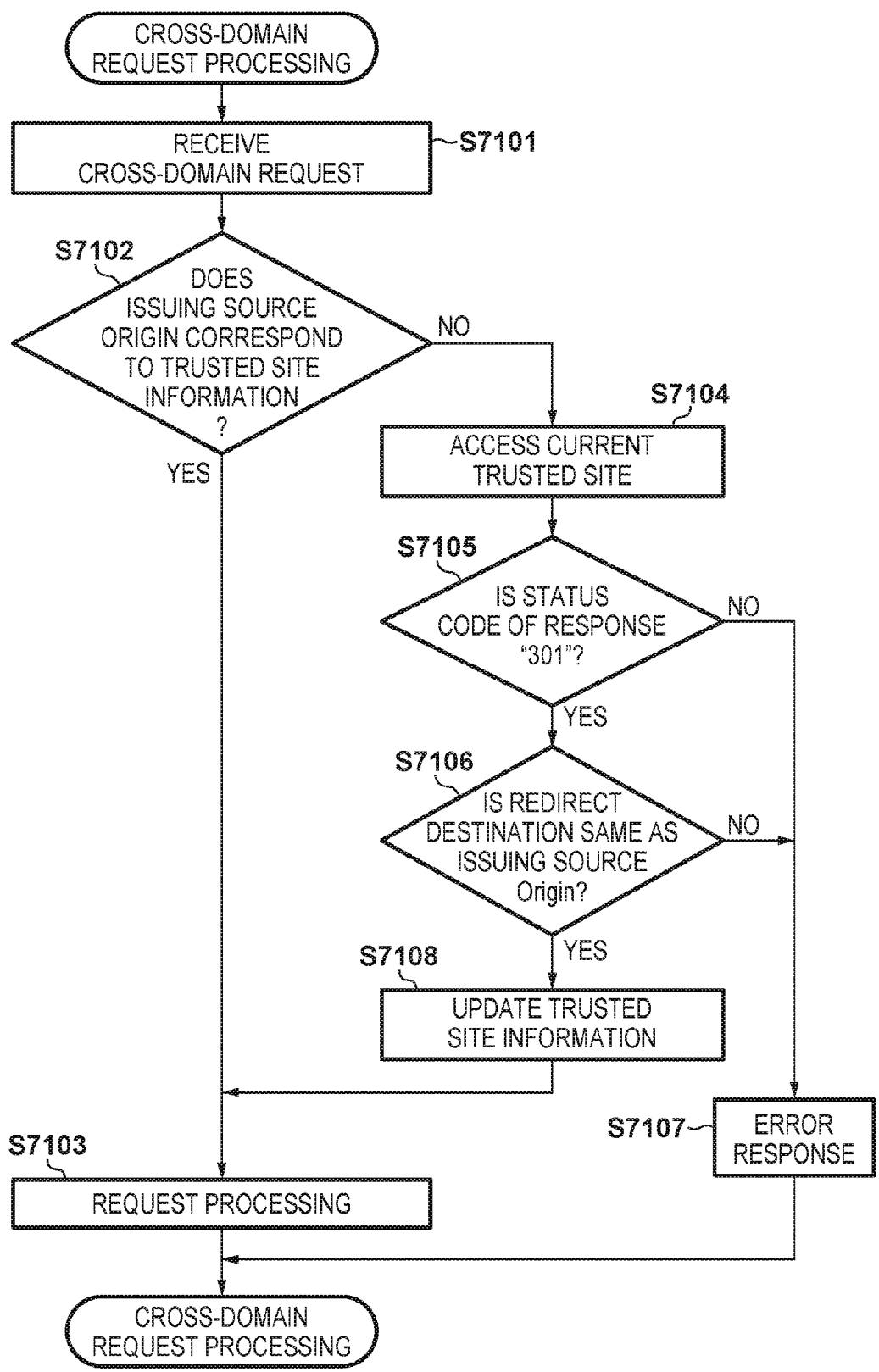

FIGS. 7A and 7B are views illustrating flowcharts for processing for updating the domain names of the printers 105-108 and the print server 104 in the print system according to the present embodiment. This processing is for explaining some of the sequence illustrated in FIG. 6 for each apparatus.

The flowchart illustrated in FIG. 7A is a flow for a time of request reception in the print server 104. This processing flow is realized by the CPU of the print server 104 executing a program held in a storage unit such as an HDD.

In step S7001, the print server 104 receives an HTTP request by the request reception unit 301 of the Web server 300.

In step S7002, the print server 104 confirms the redirect information 400 by the request processing unit 302, and confirms whether the redirect information 400 corresponding to the HTTP request received in step S7001 is set. If there is no corresponding redirect information 400 (NO in step S7002), in step S7003 the print server 104 sends a request to the printing Web application 310 by the request processing unit 302, and executes normal print processing. This processing flow is then terminated.

However, if corresponding redirect information 400 exists (YES in step S7002), in step S7004, the print server 104 returns, by the Web server 300, a response that includes redirection destination information that sets an HTTP status code "301". Here, the redirection destination information corresponds to the redirect destination 402 of the redirect information 400. This processing flow is then terminated.

The flowchart illustrated in FIG. 7B is a flow for a time of a cross-domain request reception in the printers 105-108. This processing flow is realized by the CPU of the printer reading and executing a program stored in an HDD or the like.

In step S7101, the pull-printing application 340 receives, by the request reception unit 342, a cross-domain request from a client terminal.

In step S7102, the pull-printing application 340 determines, by the pull-printing controller 341, whether issuing source Origin information included in the request received in step S7101 corresponds to information included in the trusted site information 440. If there is a correspondence to the trusted site information 440 (YES in step S7102), in step S7103, the pull-printing application 340 executes, by the pull-printing controller 341, processing such as for sending a print request to the print server 104 in accordance with a cross-domain request. This processing flow is then terminated.

However, if there is no correspondence to the trusted site information 440 (NO in step S7102), in step S7104, the pull-printing application 340 attempts access by an HTTP request to the domain name currently held in the trusted site information 440, via the request sending unit 343. In other words, an access request is sent here.

Upon receiving a response to the HTTP access request of step S7104, in step S7105, the pull-printing application 340 confirms, by the pull-printing controller 341, the HTTP status code. Here, the pull-printing controller 341 determines whether the HTTP status code is "301", which indicates a redirect. If the HTTP status code is not the code "301" (NO in step S7105), processing proceeds to step S7107. Note that as described above, the HTTP status code is not limited to "301", and another defined redirect status code ("30x") may be used.

If the HTTP status code is the code "301" (YES in step S7105), in step S7106, the pull-printing controller 341 confirms the redirection destination information included in the response. Here, the pull-printing controller 341 determines whether the domain name of the redirection destination information matches the Origin information of the request received in step S7101. If there is a match (YES in step S7106), in step S7108, the pull-printing application 340, by the pull-printing controller 341, updates the trusted site information 440 by the domain name of the redirection destination information. Thereafter, in step S7103, the pull-printing application 340 executes, by the pull-printing controller 341, processing such as sending a print request to the print server 104 in accordance with the cross-domain request.

However, if the domain name of the redirection destination information confirmed in step S7106 is a mismatch with the Origin information of the request received in step S7101 (NO in step S7106), the processing proceeds to step S7107.

In step S7107, the pull-printing application 340, by the pull-printing controller 341, determines that the cross-domain request received in step S7101 is improper, and returns an error response to the client terminal which is the request source. This processing flow is then terminated.

In conclusion, by the present invention, in a printer, when a cross-domain request from a generation source that is not a trusted site is received, a current trusted site is accessed, and the trusted site information is updated if redirect information is received. By this, even if the domain name of a print server has changed, it is possible to safely update trusted site information held by the printer without a user operation, and a user can continue to use a print service without being conscious of this.

Note that, in the present embodiment, description was given of an example of rewriting trusted site information, but there is no limitation to this, and, for example, configuration may be taken such that new domain name information is added in addition to holding past domain name information. In such a case, the printer may manage the trusted site information 440 in a list.

In addition, in the aforementioned embodiment, a sequence in which an HTTP redirect is used was described, but there is no limitation to this protocol, and another protocol may be used. In addition, configuration may be taken such that when a printer receives a cross-domain request, if access to a print server before a change is performed, trustworthiness is caused to be improved by performing authentication.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-158499, filed Aug. 10, 2015, which is hereby incorporated by reference herein in its entirety.

What is claimed is:

1. A print system in which a print server and a print apparatus are communicably connected, wherein the print apparatus comprises:
 a holding unit configured to hold destination information of a print server trusted as a request destination; a reception unit configured to receive a print request;
 a determination unit configured to determine, when the print request is received by the reception unit, whether destination information of a print server designated by the print request matches the destination information held by the holding unit;
 an access unit configured to request access to the print server indicated by the destination information held by the holding unit when the determination unit determines that there is no match for the destination information; and
 an update unit configured to update the destination information held by the holding unit to the destination information of the print server designated by the print request received by the reception unit when, as a response to the request by the access unit, a destination that is the same as in the destination information of the print server designated by the print request received by the reception unit is received as a redirect destination, and wherein the print server comprises:

a reception unit configured to receive a request;

a management unit configured to manage in association destination information of a first destination and destination information of a second destination that becomes a redirect destination of the request; and a processing unit configured to respond, when a destination designated by the request received by the reception unit is the first destination, to a request source of the request so as to redirect the request to the second destination, based on the destination information managed by the management unit.

2. The print system according to claim 1, wherein the print apparatus further comprises a unit configured to issue a request to a print server that the destination information designated by the print request received by the reception unit indicates whether, as a response to the request by the access unit, a destination that is the same as in the destination information of the print server designated by the print request received by the reception unit is received as a redirect destination.

3. The print system according to claim 1, wherein the print apparatus further comprises a unit configured to issue a request to the print server indicated by the destination information designated by the print request received by the reception unit when the determination unit determines that the destination information matches.

4. The print system according to claim 1, wherein the processing unit, when the destination designated by the request received by the reception unit is not the first destination, performs processing based on the request.

5. The print system according to claim 1, wherein the access unit requests access to the print server indicated by the destination information held by the holding unit by using authentication information that corresponds to that print server.

6. The print system according to claim 1, wherein the destination information is a domain name.

7. The print system according to claim 1, wherein the request is performed by using HTTP (Hyper Text Transfer Protocol).

8. The print system according to claim 1, wherein
the holding unit holds the destination information in a list, and
the update unit updates by adding the destination information of the print server designated by the print request received by the reception unit to the list.

9. The print system according to claim 1, wherein the print request received by the reception unit is a cross-domain request that goes through a client terminal and that the print server generated.

10. A print apparatus communicably connected to a print server, comprising:

a holding unit configured to hold destination information of a print server trusted as a request destination;

a reception unit configured to receive a print request; a determination unit configured to determine, when the print request is received by the reception unit, whether destination information of a print server designated by the print request matches the destination information held by the holding unit;

an access unit configured to request access to the print server indicated by the destination information held by the holding unit when the determination unit determines that there is no match for the destination information; and an update unit configured to update the destination information held by the holding unit to the destination information of the print server designated by the print request received by the reception unit when, as a response to the request by the access unit, a destination that is the same as in the destination information of the print server designated by the print request received by the reception unit is received as a redirect destination.

11. A method for controlling a print system in which a print server and a print apparatus equipped with a holding unit for holding destination information of the print server that is trusted as a request destination are communicably connected, comprising:

in the print apparatus:

receiving a print request;

determining, when the print request is received, whether destination information of a print server designated by the print request matches the destination information held by the holding unit;

requesting access to the print server indicated by the destination information held by the holding unit when it is determined that there is no match for the destination information; and updating the destination information held by the holding unit to the destination information of the print server designated by the received print request when, as a response to the requesting access, a destination that is the same as in the destination information of the print server designated by the received print request is received as a redirect destination, and in the print server:

receiving a request; managing in association destination information of a first destination and destination information of a second destination that becomes a redirect destination of the request; and responding, when a destination designated by the received request is the first destination, to a request source of the request so as to redirect the request to the second destination, based on the managed destination information.

* * * * *